Jan. 22, 1957   O. W. DILLON   2,778,115
LENS CUTTING MACHINE
Filed Dec. 9, 1954   4 Sheets-Sheet 1

INVENTOR
OSCAR W. DILLON
BY
Louis L. Gagnon
ATTORNEY

Jan. 22, 1957     O. W. DILLON     2,778,115
LENS CUTTING MACHINE Filed Dec. 9, 1954     4 Sheets-Sheet 2

INVENTOR
OSCAR W. DILLON
BY
Louis L. Gagnon
ATTORNEY

Jan. 22, 1957

O. W. DILLON 2,778,115

LENS CUTTING MACHINE

Filed Dec. 9, 1954

INVENTOR
OSCAR W. DILLON
BY
Louis L. Gagnon
ATTORNEY

Jan. 22, 1957 O. W. DILLON 2,778,115
LENS CUTTING MACHINE
Filed Dec. 9, 1954 4 Sheets-Sheet 4

INVENTOR
OSCAR W. DILLON
BY
Louis L. Gagnon
ATTORNEY

United States Patent Office 2,778,115
Patented Jan. 22, 1957

2,778,115

LENS CUTTING MACHINE

Oscar W. Dillon, Sturbridge, Mass., assignor to American Optical Company, Southbridge, Mass., a voluntary association of Massachusetts Application December 9, 1954, Serial No. 474,183

16 Claims. (Cl. 33—28)

This invention relates to improvements in optical machinery and has particular reference to a novel machine for cutting glass articles such as ophthalmic lenses to different desired perimetral contour shapes and sizes.

One of the principal objects of the invention is to provide an improved lens cutting machine so constructed and arranged as to enable the cutting tool thereof to be automatically accurately located in relation to the work or lens on the work-supporting table of the machine whereby the path of the cut and the tilt of the cutting tool relative to the surface being cut may be more positively controlled.

Another object is to provide an improved lens cutting machine embodying a novel arrangement whereby the cutting tool thereof, when initially placed in engagement with the surface of the lens to be cut, will automatically tilt and assume a position substantially normal to the surface at the point of engagement therewith and will constantly automatically adjust itself to the required angle throughout the duration of a cutting cycle regardless of the curvature of the engaged surface, the thickness or size of the lens, or the irregularities in the perimetric contour shape being provided on the lens.

A further object is to provide a lens cutting machine wherein a lens, during a cutting cycle, is held securely under controlled pressure upon the work-supporting table by improved clamping means which embodies a pair of co-operative clamping members adapted to engage opposite surfaces of the lens, with the upper or first member being movable to tend to urge the lens in a direction toward the second member and into engagement with the work-supporting table, and said second member being yieldable and adapted, upon release of the upper or first member, to urge the lens outwardly from the work-supporting table.

A still further object is to provide a lens cutting machine embodying novel means for moving the lens cutting device toward and away from the lens and novel means for tilting the cutting device so that the cutting element will be positioned substantially normal to the surface of the lens at the point of engagement therewith, and wherein said means combine and function co-operatively so that pressure applied upon the rocker arm during the cutting operation will be applied effectively in substantially the same arc described by the effective cutting area of the cutting wheel as it penetrates the surface of the lens during a cutting operation.

Another object is the provision in a machine of the above character of an improved arrangement for supporting lens patterns in position of easy reference and ready access by an operator whereby patterns may be easily and quickly interchanged.

A still further object is to provide an improved lens cutting machine which is relatively simple in its construction, efficient in its operation, and comparatively economical to manufacture.

Other objects and advantages of the invention will become apparent from the following description taken in connection with the accompanying drawings, wherein.

Referring more particularly to the drawings wherein like characters of reference designate like parts throughout the several views, the machine embodying the invention comprises a hollow base or housing 15 having in the upper central portion 16 thereof (Fig. 3) a bore 17 in which a bushing 18 is relatively fixedly retained. Mounted for rotation in bushing 18 is a shaft 19, the upper end of which has secured thereto, as by a set screw 20, the hub portion of a work-supporting table 21. The table 21 has an upwardly extending peripheral flange 22 within which is located an annular pad-carrying ring 23 to the upper surface of which is cemented or otherwise securely affixed a resilient annular lens-supporting pad 24 formed of rubber or the like and having a concave exposed surface.

Figure 1:
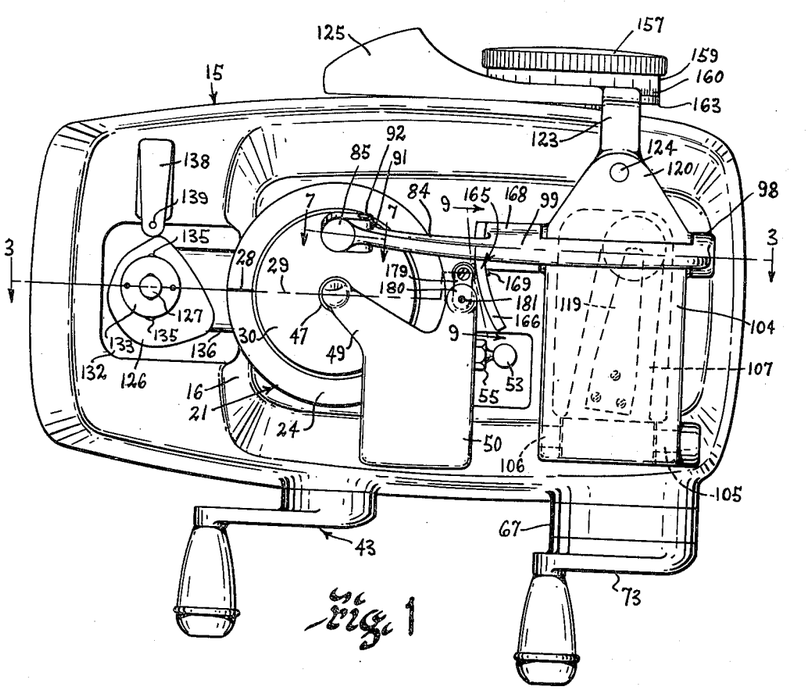
Fig. 1 is a top plan view of a lens cutting machine embodying the present invention.

The underside of the pad 24 is formed with a thickened annular portion 25 which resides within an annular recess provided therefor in the adjacent surface of the ring 23, the portion 25 of the pad 24 having a notch 26 therein into which the end of an alignment pin 27 carried by the ring 23 is adapted to extend. The exposed surface of the pad 24 is provided with an axis line 28 as shown in Fig. 1 with which an axis line 29 on a lens 30 to be cut may be aligned when the lens 30 is placed on the pad 24. The pad 24 is fixedly secured to the ring 23, and the ring 23 is retained in adjusted position on the table 21 by a set screw 31 extending through flange 22. To initially adjust the axis of the pad 24, screw 31 is loosened and pad 24 is manually turned with ring 23 to the desired position, and then screw 31 is tightened to hold the ring 23 and pad 24 in adjusted position. The portion 16 of the housing 15 also carries a ball-bearing unit 32 upon which the table 21 is positioned for easy relatively frictionless rotation.

The upper end portion of the shaft 19 is longitudinally bored as indicated at 33 and contains a short reciprocable member 34 which is of only slightly smaller outside diametric dimension than the inside diameter of the bore 33. The member 34 is held in position within the bore 33 by a set screw 35 which is carried by the wall of the shaft 19 and which extends into a groove or slot 36 formed in the member 34, the groove 36 being of a controlled length permitting a limited reciprocating movement of the member 34 within the bore 33. A coil spring 37 is located within the bore 33 between the end of the member 34 and the inner end wall of the bore 33 and functions to constantly yieldably urge the member 34 longitudinally in a direction outwardly of the bore 33, the screw 35 functioning to limit the extent of such movement. The reciprocable member 34 extends through the central openings in the annular table 21, ring 23 and annular pad 24 and has fixedly secured to the end thereof a pad-supporting block 38 which, to prevent rotation of the reciprocable member 34 independently of the shaft 19, is keyed as at 39 to the ring 23. The block 38 is thus permitted to move with the member 34 as it reciprocates. The block 38 is provided with a recess of predetermined shape which receives a removable mating adapter 40 carrying a pad 41 thereon. The pad 41 is adapted to engage the adjacent surface of a lens 30 seated on the pad 24 and, through action of spring 37, to urge the lens 30 in a direction away from the pad 24. The pad 41 may, however, be a suction cup which is removable with the lens 30 as an assembled unit. For example, the cup 41 carries a center mark or dot 42 (Fig. 10) with which the lens 30 is centered, the lens being axially aligned in known relation with the adapter 40 when being attached thereto. Since the adapter 40 can only be mounted on block 38 in a single position relative thereto, the lens 30 thus is automatically axially aligned in known relation to axis lines 28.

With this construction it is apparent that the lens will revolve about its center when the table 21 and shaft 19 are rotated about the axis of the shaft 19. The table and shaft are adapted to be manually rotated by means of a hand crank 43 which is mounted on the outer end of a crank shaft 44 (Fig. 4) extending through a side wall of the housing 15. The inner end of the crank shaft 44 carries a bevel gear 45 which functions co-operatively with a bevel gear 46 secured to shaft 19, as by a set screw 46a, Fig. 2, to cause rotation of the shaft 19. Thus, manual rotation of the crank 43 will cause consequent rotation of the work-supporting table 21 and the lens 30 positioned thereon.

Figure 2:
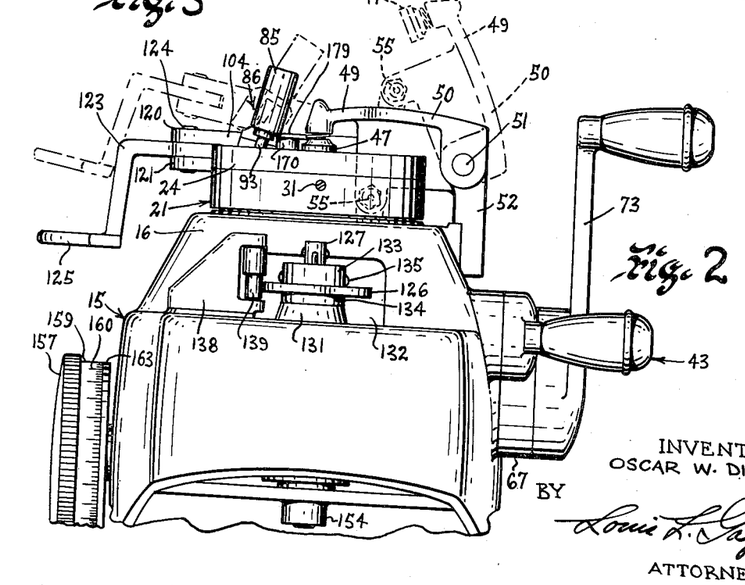
Fig. 2 is a front elevational view of the machine shown in Fig. 1.
Figures 3, 10:
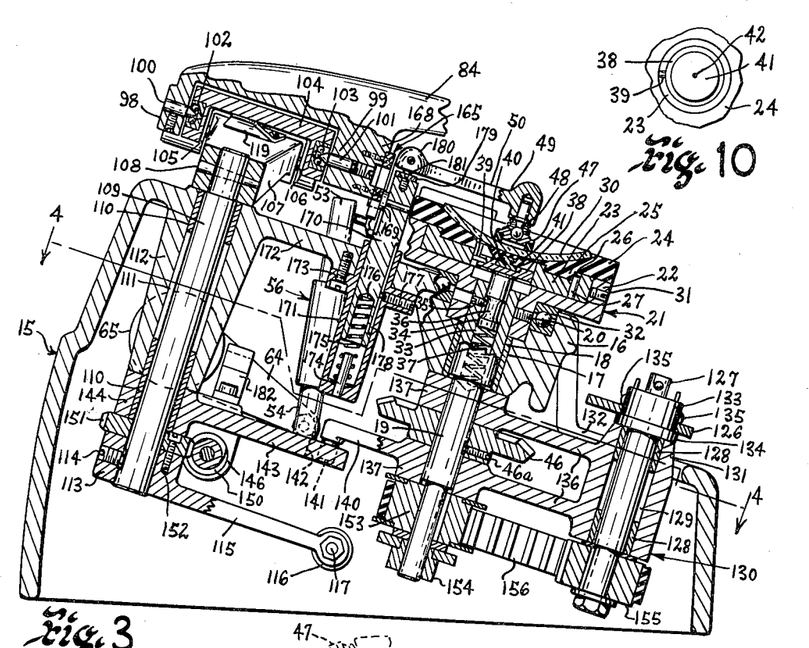
Fig. 3 is a vertical sectional view taken substantially on line 3—3 of Fig. 1 looking in the direction of the arrows.
Fig. 10 is a plan view of the lower lens-engaging pad and associated parts of the device.
Figures 5, 6:
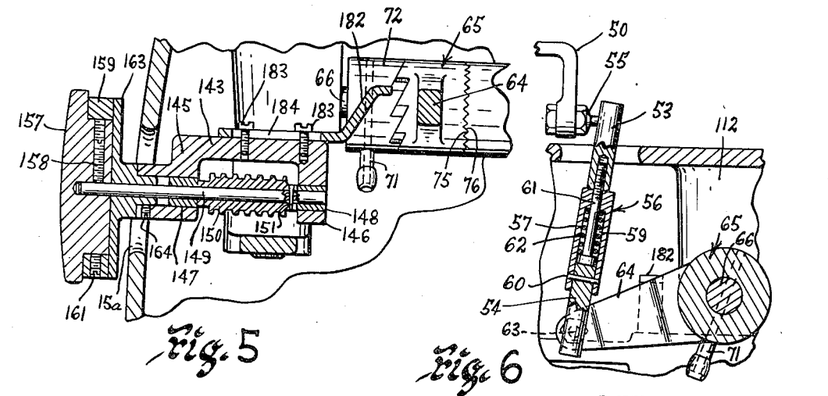
Fig. 5 is a fragmentary vertical sectional view taken substantially on line 5—5 of Fig. 4 looking in the direction of the arrows.
Fig. 6 is a fragmentary vertical sectional view taken substantially on line 6—6 of Fig. 4 looking in the direction of the arrows.

The lens 30 to be cut, as shown in Figs. 1, 2 and 3, is firmly held on the pad 24 of the table 21 by means of a bearing member 47 which is attached as by a universal ball joint connection 48 to the end of a clamp arm 49. The clamp arm 49 is an integral projecting portion of a clamp plate 50 which is pivotally attached for vertical swinging movement by a hinge 51 (Fig. 2) to a bracket 52 extending upwardly from the housing portion 16 at one side of the table 21. The upper of a pair of connecting rods 53—54 is connected adjacent one end by a ball joint connection 55 to the plate 50 (Figs. 1, 2 and 6). The connecting rods 53—54 are disposed in spaced end-to-end relation with a spring loaded device 56 connecting the adjacent ends thereof together. The spring loaded device 56 comprises a cylindrical member 57 which is partially longitudinally bored as at 59 which has its bored end mounted over the adjacent end of lower connecting rod 54 and relatively fixedly secured thereto as by a pin 60. Within the bore 59 and extending through the closed end of the cylindrical member 57 is a headed stud 61 which is threaded into the adjacent end of upper connecting rod 53, and a compression spring 62 is mounted over the stud 61 within the bore 59. With this construction it is apparent that downward movement of the lower connecting rod 54 will, through the spring loaded device 56 and upper connecting rod 53, pull downwardly the clamp plate 50 whereupon the resilient clamp pad 47 will engage the upper surface of the lens 30 substantially at the center thereof. Continued downward movement of the lower connecting rod 54, however, will cause the spring to compress, whereupon the cylindrical member 57 will move longitudinally with the lower connecting rod 54 and will separate from the upper connecting rod 53 whereupon the overall combined length of the connecting rods 53—54 will be increased. Upon release of the pressure upon lower rod 57, of course, the spring 62 will return the parts to their normal relationship.

The free end of the lower connecting rod 54 is pivotally attached by a universal joint 63 to a crank arm 64 extending outwardly from a clutch 65 which is supported for free movement upon a shaft 66. The shaft 66 is supported at one end in a portion 112 of the housing 15 and is journaled adjacent its other end in a bearing 67 (Fig. 4) which is secured as by bolts 68 or the like to a side wall 69 of the housing 15, the bearing 67 being located over an opening in the wall 69 and having a tubular portion 70 extending inwardly of the housing 15 through the opening therein toward the clutch 65.

Figure 4:
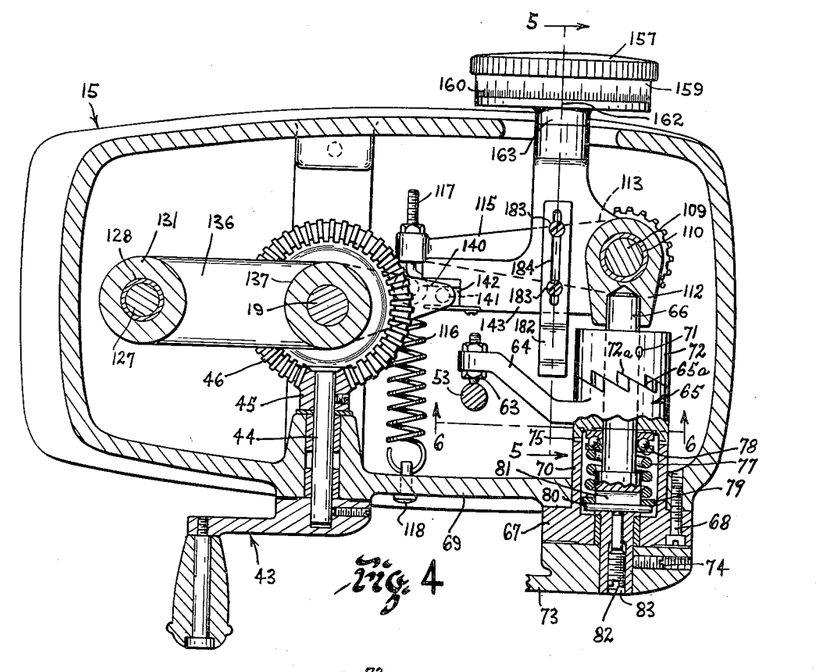
Fig. 4 is a horizontal sectional view taken substantially on line 4—4 of Fig. 3 looking in the direction of the arrows.

Mounted on the shaft 66 by a pin 71 on the opposite side of clutch 65 is a clutch-driving sleeve 72. The adjacent sides of the clutch 65 and sleeve 72 are provided with interfitting camming faces comprising notches 65a—72a, respectively, the notches each having one sharply inclined side and one gradually sloping side. On the outer end of the shaft 66 is provided a handle 73, the handle 73 being secured in desired position on the shaft 66 by a set screw 74. Manual manipulation of handle 73 in a counterclockwise direction will cause operation of the lens clamping means through consequent rotation of shaft 66 and sleeve 72. The notches 72a on sleeve 72 being interlocked with the notches 65a on clutch 65, consequent rotation of clutch 65 and crank arm 64 will result. This will cause downward movement of the connecting rods 53—54 and spring loaded device 56 to swing plate 50 downwardly whereupon the clamp pad 47 will rest on the lens 30. To lock the clamping means and thus hold the lens firmly in place during a cutting operation, the handle 73 is moved still further in a counterclockwise direction. This will cause the interlocked notches 65a and 72a to separate slightly with the gradually sloping sides of the notches sliding upon one another until a condition exists such as shown in Fig. 4. Such continued rotary movement of the sleeve 72 will, through the inclined slopes of the notches, cause displacement of the clutch 65 along shaft 66 in a direction toward the tubular portion 70 of bearing 67. The adjacent ends of the clutch 65 and tubular portion 70 of bearing 67 are respectively provided with teeth 75 and 76 (Fig. 5). Thus, movement of the clutch 65 toward tubular portion 70 will cause engagement of the teeth 75—76, thus preventing further rotary movement of the clutch 65.

The longitudinal displacement of the clutch 65 as described above is accomplished against the inherent tension of a coiled tension spring 77 (Fig. 4) which is mounted over the shaft 66 within the tubular portion 70 of the bearing 67. One end of the spring 77 engages a ball bearing unit 78 which is in engagement with the adjacent end of the clutch 65. The other end of the spring 77 engages a washer 79 which encircles the shaft 66 within tubular portion 70. Thus the clutch 65 is constantly urged by the spring 77 in a direction toward the sleeve 72. Means is provided for controlling the tension of the spring 77 and comprises a pin 80 which extends through a slot 81 in the shaft 66. The washer 79 rests upon the pin 80 and the pin is adjustable longitudinally of the shaft 66 within the slot 81 by an adjusting stud 82 which is threadedly located in a longitudinal bore 83 formed in the outer end of shaft 66 and which engages the pin 80. Thus, by adjustment of stud 82, the pin 80 and washer 79 can be adjusted longitudinally of shaft 66 to compress or expand the spring 77 and thus provide the desired amount of tension upon the clutch 65.

It is apparent that when the handle 73 is released, the shaft 66 will be rotated in a clockwise direction whereupon the clutch mechanism will return to normal inoperative condition. Simultaneously, the crank arm 64 will move the connecting rods 53—54 upwardly, causing the plate 50 to swing upwardly on its pivot 51, freeing the clamp pad 47 from the lens 30, whereupon the lens 30 will be urged slightly upwardly for easy removal from table 21 by the spring 37.

Figure 7:
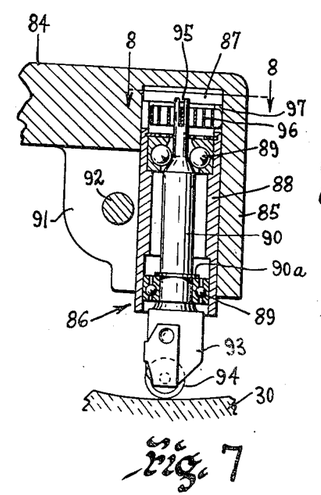
Fig. 7 is an enlarged fragmentary vertical sectional view taken substantially on line 7—7 of Fig. 1 looking in the direction of the arrows.
Figure 8:
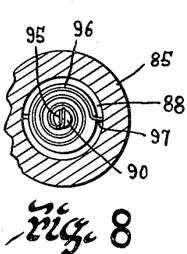
Fig. 8 is a fragmentary horizontal sectional view taken substantially on line 8—8 of Fig. 7 looking in the direction of the arrows.

A cutter-supporting arm 84 extends from the rear upper side of the device into overlying relation with the table 21 and has enlarged a head 85 (Figs. 1, 2 and 7) which carries a lens cutting device 86. The head 85 is bored as indicated at 87 and within the bore 87 is positioned the cutting device 86 which embodies a sleeve 88 within which, in spaced ball bearings 89, is located a spindle 90, the spindle being prevented from becoming displaced by a collar 90a thereon which rests on the lower ball bearing 89. The head 85 is split or slotted at 91 in one side thereof, with the slot 91 extending to the bore 87. Thus by tightening a stud 92 which connects the split portions of the head on opposite sides of the slot 91 the portions can be drawn toward each other, narrowing the slot, and clamping the cutting device 86 firmly in place.

The outer end of the spindle 90 has secured to it a hanger or yoke 93 which supports a cutting disc or wheel 94. The edge of the cutting wheel 94 is adapted to engage the lens 30 and, as the table 21 and lens 30 are rotated, to cut the lens. The cutting wheel 94 is mounted so that it lies in a plane subtantially parallel with the path of movement of the lens at the particular point of engagement therewith. It is apparent, however, that when a lens 30 is being provided with an irregular perimetral contour shape, the cutting wheel 94 must change its position as the lens 30 is rotated so that it will constantly lie in said plane or in the direction of cut. Therefore, the inner end of the spindle 90 is slotted at 95 to receive one end portion of a coiled flat spring 96, the other end of which is anchored in a slot 97 formed in the sleeve 88. Thus the cutting wheel 94 can turn with the spindle 90, the spindle 90 turning on the bearings 89 against the tension of the spring 96. At the conclusion of a cutting cycle or disengagement of the cutting wheel 94 from a lens 30, the spring 96 will cause the spindle 90 and cutting wheel 94 to return to their normal initially set positions.

The cutter-supporting arm 84 is provided with a pair of spaced downwardly extending ears 98 and 99, see Fig. 3, each of which carries a respective pivot pin 100—101. The pivot pins 100—101 are coaxially aligned and extend through the respective ears 98—99 toward each other, and each are provided with a tapered end which are supported in ball bearing units 102 and 103 respectively carried by the opposed sides of a main supporting plate 104. Thus the cutter-supporting arm 84 is pivotally adjustable about the longitudinal axis of the pivot pins 100—101. The main supporting plate 104 is, in turn, pivotally attached to one end of a supporting bar 107 for vertical swinging movement on pivot pins 105 and 106 (Fig. 3), the supporting bar 107 being secured adjacent its other end as by a pin 108 to the upper end of a vertically disposed shaft 109. The shaft 109 is rotatably mounted in bushings 110 disposed within a vertical bore 111 provided in the portion 112 of the base or housing 15.

A leaf or other suitable type of spring 119 (Figs. 1 and 3) is screwed or otherwise secured at one end thereof to the upper surface of the supporting bar 107 and is shaped to yieldably engage the underside of the main supporting plate 104 and to constantly urge the plate 104 upwardly. In so doing, such upward movement of the plate 104 will consequently move the cutter-support-ing arm 84 upwardly which will, in turn, cause the cutting device 86 to be lifted off and held in spaced relation above the lens 30. The free end of the supporting plate 104 is formed with a pair of spaced earlike portions 120 and 121 (Figs. 1 and 2) and a handle or lever 123 is inserted between the earlike portions 120—121 and held therein as by a pin or the like 124. The handle 123 is shaped to extend downwardly and forwardly of the device and is provided with a thumbpiece 125, whereby an operator of the device may press the thumbpiece 125 downwardly which will thus cause consequent downward movement of the supporting plate 104 against the tension of the spring 119, moving the cutting device 86 downwardly toward the lens 30 and causing the cutting wheel 94 to engage the upper surface of the lens 30. At this time, assuming the clamping device has been previously operated to hold the lens of the table 21, handle 43 may be operated to rotate the table 21 and lens 30 thereon whereupon the cutting wheel 94 will cut the lens 30.

It is particularly pointed out here that the cutting device 86 is so positioned in head 85 that the effective cutting edge of the cutting wheel 94 is substantially aligned with the axis of the pivot pins 100—101. Therefore, when the arm 84 is adjusted about the axis of pivot pins 100—101, the cutting device 86 will consequently also be adjusted accordingly about the effective cutting edge of the cutting wheel 94. This adjustment is provided for tilting the cutting wheel 94 to the desired angular relation with the surface of the lens 30 as will be described hereinafter.

The lower end of the shaft 109 has a hub 113 secured thereto as by a set screw 114, the hub having an arm 115 extending therefrom in a direction forwardly of the device. A coil spring 116 having one end connected as by an eyebolt 117 to the outer end of the arm 115 has its other end connected to a stud 118 carried by the wall 69 of the housing 15 thus rotary movement in one direction of the shaft 109 will be accomplished against the tension of the spring 116.

The lens 30, of course, is to be provided with a perimetral contour shape of determined configuration. Therefore, a pattern must be used to control the resultant contour shape of the lens. In the present invention, as shown best in Fig. 3, the pattern 126 is removably mounted on a shaft 127 which is rotatably mounted in bushings 128 disposed within a vertical bore 129 formed in one end of a lever 130. The lever 130 is located within the forward portion of the housing 15 and has a portion 131 thereof extending upwardly through an opening 132 in the housing 15. The shaft 127 extends upwardly through the bore 129 and outwardly of the portion 131 of the lever 130 and has a retainer 133 thereon over which the pattern 126 is adapted to be located. The retainer 133 is provided with a flangelike portion 134 forming a seat upon which the pattern 126 is adapted to be positioned and resilient depressible spring grip members 135 are carried by the retainer 133 for retaining the pattern 126 in desired position thereupon. The lever 130 is provided with a pair of spaced rearwardly extending arm portions 136, the ends of which are formed with hubs 137, the hubs 137 being mounted upon the shaft 19 whereby the lever 130 will be freely rotatable about the axis of the shaft 19 and independently thereof. The bevel gear 46 on shaft 19 is positioned between the hubs 137 and thus prevents displacement of the lever 130. A bracket 138 is fixedly mounted on the housing 15 and carries a roller 139, see Fig. 2, which is adapted to be engaged by the peripheral edge of the pattern 126. The lower hub 137 of the lever 130 is provided with a rearwardly extending arm 140 (Figs. 3 and 4). The arm 140 is provided with a downwardly extending finger 141 which extends into a slot 142 provided in the end of an arm 143 which is mounted on shaft 109. The hub portion 144 of arm 143 is freely rotatable on shaft 109 and is provided with a pair of spaced downwardly extending portions 145 and 146, see Fig. 5, which are provided with coaxial openings in which are located bushings 147—148, respectively. The bushings rotatably receive therein a transversely extending shaft 149 on which a worm 150 is secured as by a pin 151. Worm 150 is constantly in mesh with a gear 151a, see Fig. 3, which is mounted on shaft 109 between the hubs 144 and 113 and which is attached directly to the hub 113 as by a screw 152.

It is apparent that any movement of the pattern supporting shaft 127 and lever 130 about the axis of shaft 19, will, through arm 140 and finger 141, cause transverse swinging movement of arm 143 about axis of shaft 109. This will consequently cause movement of the gear 151 through worm 150, as described above, whereupon arm 115 will be rotated against the tension of spring 116 and shaft 109 will consequently rotate about its axis. Such rotary movement of shaft 109 will, through supporting bar 107 and main supporting plate 104, cause cutter-supporting arm 84 to revolve about the axis of shaft 109. Thus the cutting device 86 will consequently be adjusted toward or away from the center of the lens 30.

In order to cause such motion of the cutting device 86 during a lens cutting operation, it is necessary to rotate the pattern 126. In order to accomplish this, the shaft 19 is provided adjacent its lower end with a pulley 153, which pulley is held in place thereon as by suitable retainer 154. Mounted on the pulley 153 and on a substantially similar pulley 155, which is carried by the lower end of shaft 127, is a belt 156. Thus rotary movement of shaft 19 will be transmitted through the belt 156 and pulleys 153—155 to the shaft 127 whereupon the pattern 126 will rotate. It is apparent that the space between shafts 19 and 127 and the relative sizes of the pulleys 153—155 are predetermined so that the pattern 126 will rotate in synchronism with lens 30.

It is apparent from the foregoing description that coil spring 116 will function through arms 143—140 and lever 130 to maintain the pattern in constant engagement with the roller 139. However, as the pattern 126 is rotated, the irregular contour shape thereof will cause the shaft 127 to swing transversely about axis of shaft 19. This will consequently cause similar movement of the cutting device 86 whereupon the lens 30 will be provided with a perimetral contour shape similar to that of the pattern 126.

Size control means is provided and comprises a knurled knob 157 which is mounted on the outer end of the worm gear shaft 149 externally of the housing 15 and held thereupon as by a set screw 158 (Fig. 5). The knob 157 carries a ring 159 thereupon which is provided with a scale 160 about its circumference. The ring 159 is retained in desired relation with respect to the knob 157 by means of a set screw 161. The scale 160 is adapted to register co-operatively with an index mark 162 on the periphery of a hub 163 which extends through the opening 15a of the housing 15 and is attached as by a set screw 164 (Fig. 5) to the downwardly extending portion 145 of arm 115. Thus, the knob 157 may be manually rotated to cause resultant rotary movement of the worm 150. This, through gear 151 and shaft 109 will cause adjustment of the cutter-supporting arm 84 and cutting device 86 as desired in accordance with the scale 160. Such adjustment is, of course, performed independently and without movement of the arm 143.

Means is provided for overcoming the tension of the coil spring 116 to allow the pattern 126 to be spaced from the roller 139 and thus easily removed and interchanged. Such means comprises a bent member 182 (Figs. 3, 4 and 5) which is mounted for longitudinal adjustment on the arm 143 as by screws 183 which extend thereinto through a longitudinal slot 184 in the bent member 182. The bent end portion of the member 182 extends into adjacent relation with the clutch-driving sleeve 72 in such a manner that the pin 71 thereon almost engages the member 182 when the parts of the device are in normal inoperative position. However, rearward or clockwise movement of the handle 73 will, through consequent rotation of the shaft 66, cause the sleeve 72 also to rotate. Thus pin 71 will engage the inclined portion of the member 182 and urge it in the direction of the size-control knob 157. This will cause the arm 143 to rotate shaft 109 to swing the cutter-supporting arm 84 and cutting device outwardly from overlying relation with the lens. Simultaneously arm 143 will, through arm 140, cause arm 136 and shaft 127 to swing the pattern 126 away from the roller 139 for easy removal.

Figure 9:
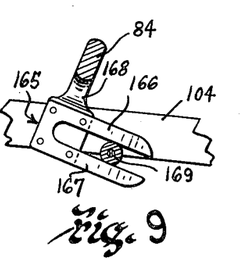
Fig. 9 is an enlarged fragmentary vertical sectional view taken substantially on line 9—9 of Fig. 1 looking in the direction of the arrows.

It is apparent that the presently described device can be used for cutting lenses of various thicknesses. Means is also provided for tilting the cutting device 86 automatically to a position wherein the cutting wheel 94 will automatically and consistently be positioned in a plane substantially normal to the tangent of the lens surface at the point of cutting wheel engagement therewith throughout the cutting cycle regardless of the surface shape and change of lens thickness at the points of cut which results when the cutter moves inwardly and outwardly relative to the center of the lens as when an irregular contour shape is being formed. This is accomplished by providing the cutter-supporting arm 84 with a forked or bifurcated tilting or guide member 165 (Figs. 1 and 9), the bifurcations or guides 166—167 thereon extending substantially normal to the plane of the side of the cutting wheel 94. The guide member 165 may be riveted or otherwise attached to a portion 168 of the arm 84.

A roller 169 (Figs. 1 and 9) is positioned between the guides 166—167 to cause the required tilting of the arm 84 and the cutting wheel 94, as will be evidenced from the following description. The roller 169 is attached to a vertically disposed aligning rod 170 (Figs. 2 and 3). The aligning rod 170 is located for limited longitudinal movement in a hollow cylindrical retainer 171 which is secured to the top 172 of the housing 15 as by screws 173. The top 172 has an opening therein through which an open end portion of the retainer extends. The aligning rod 170 is positioned within the retainer 171 and extends upwardly out of the open end thereof. The other end of the retainer 171 is seated and carries an inwardly extending pin 174 on which a coiled spring 175 is positioned. One end of the spring 175 is positioned within a recess 176 in the adjacent inner end of the aligned rod 170 and the other end rests upon the sealed end portion of the retainer 171. Thus the spring 175 functions to continually urge the aligning rod 170 upwardly. A set screw 177 is mounted in a side wall portion of the retainer 171 and engages a longitudinal groove 178 in the aligning rod 170, the ends of the groove 178 providing stops for limiting the extent of longitudinal movement of the aligning rod 170 within the retainer 171.

The upper end of the aligning rod 170 has a contact plate 179 screwed or otherwise attached thereto, the plate 179 extending into underlying relation with a second transversely extending projection 180 (Figs. 1 and 3) formed on the clamp plate 50. The projection 180 carries an adjustable contact screw 181 which engages the contact plate 179 when the clamping device is being operated to clamp the lens 30 firmly in place on the table 21.

The projection 180 and screw 181 will move the aligning rod 170 downwardly against the spring 175 until the clamp pad 47 is firmly seated upon the lens 30. In this way the roller 169 which is carried by the aligning rod 170 will simultaneously be moved downwardly an amount controlled by the amount of downward movement of the clamp pad 47 as controlled by the center thickness of the lens. This thereby locates the roller 169 in a given fixed selected position even with the top surface of the center of the lens.

Thus, when the cutting device 86 is swung downwardly to position the cutting wheel 94 in engagement with the lens surface, the arm 84 may be swung transversely of the device by the pattern 126 during a cutting cycle as described. As the arm 84 moves during a cutting operation, the bifurcated tilting or guide member 165 will also move with respect to the roller 169. Thus, since the roller 169 is fixed substantially in the plane of the targent of the lens surface at the center thereof, it is apparent that as the cutting wheel 94 follows the rising or falling surface of the lens 30, as the lens 30 is being rotated, it will cause the arm 84 to be automatically tilted about the roller 169. Such tilting will automatically position the cutting wheel 94 in a plane substantially normal to the tangent of the lens surface at the point of engagement therewith.

Figures 11, 13:
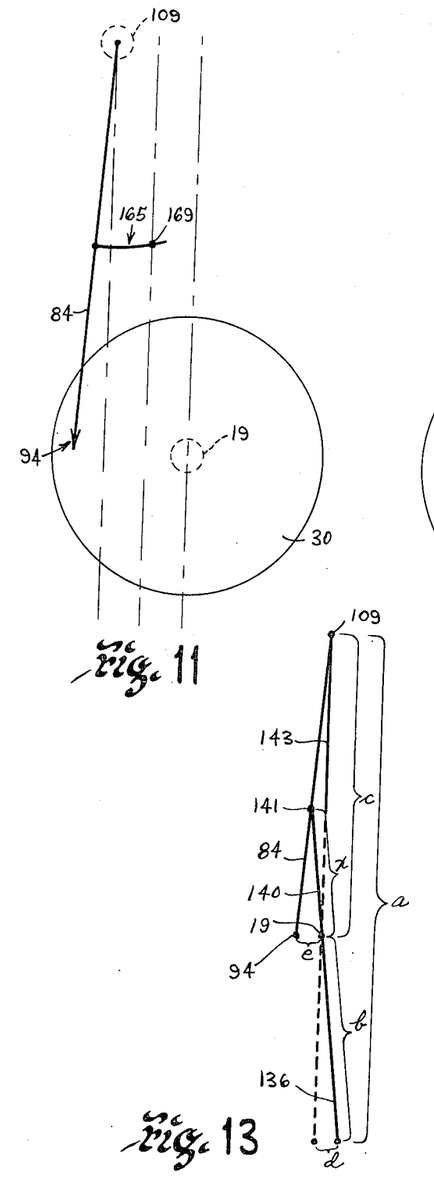
Figs. 11 and 12 are diagrammatic views illustrating the function of the lever arrangement associated with the cutter arm for tilting said arm with respect to the surface of the lens during the movement of the arm in a direction transversely of the lens.
Fig. 13 is a diagrammatic view of other mechanism associated with the cutter for controlling its ratio of movement with respect to the former during the cutting operation.
Figure 12:
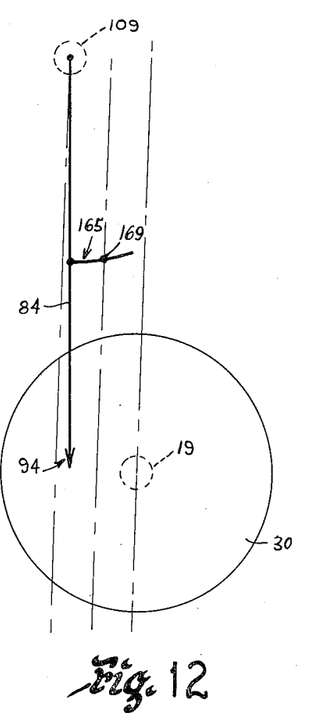

The cutting wheel is constantly maintained in said plane substantially normal to the tangent of the lens surface at the point of engagement therewith by the particular arrangement above described wherein the pivot point about which the cutting wheel is tilted comprises the roller 169 which is constantly maintained in a position substantially aligned with the plane of the tangent of the center of the exposed surface of the lens 30 regardless of its thickness; also, as the cutter-supporting arm 84 swings transversely, in response to the movement of the shaft 109, tilting of the cutting device 86 to different given angles also automatically takes place. This feature is illustrated diagrammatically in Figs. 11 and 12. Referring to Fig. 12 it is apparent that when the roller 139 engages a low spot on the edge of the pattern 126, the cutting wheel 94 will thereby be positioned nearer the center of the lens 30. At this location the longitudinal axis of the cutter-supporting spindle mounted on the cutter-supporting arm 84 will be so tilted with respect to the longitudinal axis of shaft 109 that the guide member 165, moving in response to the fixed roller 169, will be about a short radius for tilting of the cutting device 86. This radius varies continually as the arm 84 swings outwardly and inwardly on the spindle or shaft 109 relative to the center of the lens in response to the shape of the pattern 126 during the cutting of an irregular shaped lens 30. This is indicated in Fig. 11 wherein it is apparent that when the roller engages a high spot on the edge of the pattern 126 the cutting device 86 is positioned outwardly with respect to the center of the lens or closer to the edge of said lens 30, changing the angle of arm 84 with respect to shaft 109, and lengthening the effective radius of movement of the guide member 165 relative to the roller 169. The angle of tilt of the cutting device 86 will accordingly change with the ratio of change of said effective radius of movement and with the movement of the cutting edge upwardly or downwardly with respect to the tangent at the center of the top surface of the lens. The center about which such tilting of the cutting device occurs, that is, the roller 169, remains constant after a lens 30 has been clamped in place while the effective radius of movement of the member 165 is constantly varied. This feature of changing the effective radius of movement of the member 165 has been found to more accurately locate the cutting wheel in a plane substantially normal to the tangent of the lens surface at any point of engagement therewith than has heretofore been known to be possible in machines of this character.

It is particularly pointed out that when pressure is applied to the thumbpiece 125 to press the cutting wheel 94 firmly against and slightly into the lens surface during a cutting operation, that the rocker arm 84 will simultaneously pivot a slight amount about the axis of roller 169 to an extent controlled by the amount of movement required for actual engagement of the cutting wheel 94 with the surface of the lens 30. Such pivotal movement combines with the function of the pivot pins 105 and 106 in permitting rotary motion of the main supporting plate 104 when pressure is applied to the thumbpiece 125, to cause the actual line of force to be applied subperpendicular to the surface of the lens by the cutting wheel as the lens is rotated. This has been found to result in a much sharper or cleaner cut, and one which does not require subsequent smoothing of the edges before the lens may eventually be finished for use.

It is also pointed out that although the problem of placing the pattern 126 handily at the front of the machine appeared to require relatively complicated linkage to cause response of the cutting device 86 to irregularities in the contour shape of the pattern, actually the presently described solution to the problem is relatively simple and the structure to accomplish this is relatively simple and results in exceedingly accurate transverse movement of the cutting device 86 in response to and in amounts substantially equal to the movement of the pattern 126 as it maintains engagement with the roller 139 during rotation. This linkage is illustrated diagrammatically in Fig. 13 wherein the various spindles and pivots 109, 127, 19 and 141 are indicated by numbered dots, and the arms 84, 136, 140 and 143 by numbered lines, and the cutting device 86 by numbered dot.

The lengths of arms 136, 140 and 143 have been computed on a 3-2 ratio; that is, assuming for example that the overall length (distance $a$) from pattern spindle 127 to rear shaft or spindle 109 is five inches, then with arm 136 (distance $b$) being two inches, the remaining distance $c$ is three inches. Since it is necessary that as the pattern spindle 127 moves distance $d$, the cutting device should move an equal distance $e$. Therefore, the length of arm 140 (or distance $x$) must be determined and controlled to provide the required amount of leverage on the cutter-supporting arm 84. This is solved by the proportion $$\frac{b+c}{c}$$

as $$\frac{b}{x}$$

Solving this we find $x=1\frac{1}{3}''$. Therefore making arm 140 $1\frac{1}{3}''$ long results in accurate equalized movement of the cutting device 19 in response to corresponding transverse movement of the pattern during a cutting operation.

From the foregoing description it is apparent that the presently described lens cutting machine embodies several novel improvements whereby the machine more accurately, efficiently and easily cuts lenses to predetermined perimetral contour shapes in accordance with the objects and advantages of this invention.

It will also be apparent that changes may be made in the details of construction, arrangement of parts and methods shown and described without departing from the spirit of the invention as expressed in the accompanying claims. Therefore, it is to be understood that all matter set forth or shown in the accompanying drawings is to be interpreted as illustrative and not in a limiting sense.

I claim:

1. In a cutting machine of the character described, a base, a spindle rotatable in said base, a work table carried by the spindle for rotation therewith, a first lever in said base pivotal about the axis of said spindle, pattern means carried by said lever and rotatable in synchronism with said lever and rotatable in synchronism with said work table, a second lever extending in the opposite direction of the spindle, from said first lever and pivotal therewith about the axis of the spindle, a shaft rotatably mounted in the base and having a third lever thereon and movable therewith, one end of said third lever being operatively connected adjacent one end of said second lever, whereby rotary motion of said shaft will result from movement of said pattern means and first lever about the axis of the spindle, a rocker arm pivotally attached at one end to said shaft for movement therewith and extending into overlying relation with said work table, cutting means carried by said rocker arm, and clamp means operable to engage and clamp work on said work table in position to be engaged by said cutting means.

2. In a cutting machine of the character described, a base, a spindle rotatable in said base, a work table carried by the spindle for rotation therewith, a first lever in said base pivotal about the axis of said spindle, pattern means carried by said lever and rotatable in synchronism with said work table, a second lever extending in the opposite direction from said first lever and pivotal therewith about the axis of the spindle, a shaft rotatably mounted in the base and having a third lever thereon and movable therewith, one end of said third lever being operatively connected with one end of said second lever, whereby rotary motion of said shaft will result from movement of said pattern means and first lever about the axis of the spindle, a rocker arm pivotally attached at one end to said shaft for movement therewith and extending into overlying relation with said work table, cutting means carried by said rocker arm, clamp means operable to engage and clamp work on said work table in position to be engaged by said cutting means, and pressure means operatively connected to said rocker arm for urging said cutting means into effective cutting relation with work on said work table.

3. In a cutting machine of the character described, a base, a spindle rotatable in said base, a work table carried by the spindle for rotation therewith, a lever in said base pivotal about the axis of said spindle and having diametrically opposed long and short arms, pattern means carried by said long arm and rotatable in synchronism with said work table, a shaft rotatably mounted in the base and having an operating arm thereon and movable therewith, one end of said operating arm being operatively connected with said short arm, whereby rotary motion of said shaft will result from movement of said pattern means and said lever about the axis of the spindle, a cutter arm pivotally attached at one end to said shaft for movement therewith and extending into overlying relation with said work table, cutting means carried by said cutter arm, clamp means on said base operable to engage and clamp work on said work table in position to be engaged by said cutting means, and pressure means operatively connected to said cutter arm for urging said cutting means into effective cutting relation with work on said work table.

4. In a cutting machine of the character described, a base, a spindle rotatable in said base, a work table carried by the spindle for rotation therewith, clamp means operable to engage and clamp work on said work table, a lever in said base pivotal about the axis of said spindle and having diametrically opposed long and short arms, pattern means carried by said long arm and rotatable in synchronism with said work table, a shaft rotatably mounted in the base and having one end of a shaft-controlling arm thereon and movable therewith, the other end of said shaft-controlling arm being operatively connected with said short arm, whereby rotary motion of said shaft will result from movement of said pattern means and consequently of said lever about the axis of the spindle, a rocker arm pivotally attached at one end to said shaft for movement therewith and extending into overlying relation with said work table, cutting means carried by the other end of said rocker arm and adapted to engage the work on said work table, the effective length of said rocker arm between the shaft and the cutting means being substantially equal to the effective length of the lever between said pattern means and the connection to said shaft-controlling arm, and the effective length of said short arm of the lever being so controlled as to cause movement of the rocker arm in one transverse direction when said pattern means is moved in the opposite transverse direction and whereby the extent of transverse movement of the cutting means will be substantially equal ot the extent of transverse movement of the pattern means, and means operatively connected to said rocker arm for urging said cutting means into effective cutting relation with the work on said work table.

5. In a cutting machine of the character described, a base, a spindle rotatable in said base and carrying a work table for rotation therewith, a clamp means on said base operable to engage and clamp work on said work table, a rocker arm mounted on a shaft journaled in said base and overlying said work table and carrying cutting means adapted to engage work on said work table, pattern means at one end of the base rotatable in synchronism with said work table, motion transfer means connected with said pattern means and rocker arm for moving said rocker arm and cutting means transversely of the base in accordance with variations in a pattern carried by said pattern means, said motion transfer means comprising a lever in said base pivotal about the axis of said spindle and having diametrically opposed long and short arms, said pattern means being rotatably mounted on said long arm, and an operating arm mounted on said shaft for movement therewith and operatively connected with the short arm of said lever whereby rotary motion of said shaft will result from movement of said pattern means and consequently of said lever about the axis of the spindle, the effective length of said rocker arm between the shaft and the cutting means being substantially equal to the effective length of the lever between said pattern means and the connection to said shaft-controlling arm, and the effective length of said short arm of the lever being so controlled as to cause movement of the rocker arm in one transverse direction when said pattern means is moved in the opposite transverse direction and whereby the extent of transverse movement of the cutting means will be substantially equal to the extent of transverse movement of the pattern means, and means operatively connected to said rocker arm for urging said cutting means into effective cutting relation with work on said work table.

6. In a cutting machine of the character described, a base, a spindle rotatable in said base and carrying a work table for rotation therewith, clamp means on said base operable to engage and clamp work on said work table, a rocker arm mounted on a shaft journaled in said base and overlying said work table and carrying cutting means adapted to engage work on said work table, pattern means at one end of the base rotatable in synchronism with said work table, motion transfer means connected with said pattern means and rocker arm for moving said rocker arm and cutting means transversely of the base in accordance with variations in a pattern carried by said pattern means; said motion transfer means comprising a first lever in said base pivotal about the axis of said spindle and having said pattern means rotatably mounted thereon, a second lever extending in the opposite direction from said first lever and pivotal therewith about the axis of the spindle, and a third lever on said shaft for movement therewith and operatively connected with said second lever whereby rotary motion of said shaft will result from movement of said pattern means and consequently of said first and second levers about the axis of the spindle, the effective length of said rocker arm between the shaft and the cutting means being substantially equal to the effective combined length of the first and second levers between said pattern means and the conection to said third lever, and the effective length of said second lever being so controlled as to cause movement of the rocker arm in one transverse direction when said pattern means is moved in the opposite transverse direction and whereby the extent of transverse movement of the cutting means will be substantially equal to the extent of transverse movement of the pattern means and means operatively connected to said rocker arm for urging said cutting means into effective cutting relation with work on said work table.

7. In a cutting machine of the character described, a base, a spindle rotatable in said base and carrying a work table for rotation therewith, clamp means on said base operable to engage and clamp work on said work table, a rocker arm mounted on a shaft journaled in said base and overlying said work table and carrying cutting means adapted to engage work on said work table, pattern means at one end of the base rotatable in synchronism with said work table, motion transfer means connected with said pattern means and rocker arm for moving said rocker arm and cutting means transversely of the base in accordance with variations in a pattern carried by said pattern means, said motion transfer means comprising a first lever in said base pivotal about the axis of said spindle and having said pattern means rotatably mounted thereon, a second lever extending in the opposite direction from said first lever and pivotal therewith about the axis of the spindle, and a third lever on said shaft for movement therewith and operatively connected with said second lever whereby rotary motion of said shaft will result from movement of said pattern means and consequently of said first and second levers about the axis of the spindle, the effective length of said rocker arm between the shaft and the cutting means being substantially equal to the effective combined length of the first and second levers between said pattern means and the connection to said third lever, and the effective length of said second lever being so controlled as to cause movement of the rocker arm in one transverse direction when said pattern means is moved in the opposite transverse direction and whereby the extent of transverse movement of the cutting means will be substantially equal to the extent of transverse movement of the pattern means, means operatively connected to said rocker arm for urging said cutting means into effective cutting relation with work on said work table, and size control means connected with said motion transfer means for rotating said shaft relative to said motion transfer means to adjust said rocker arm and cutting means independently of said pattern means.

8. In a cutting machine of the character described, a base, a spindle rotatable in said base and carrying a work table for rotation therewith, clamp means on said base operable to engage and clamp work on said work table, a rocker arm mounted on a shaft journaled in said base and overlying said work table and carrying cutting means adapted to engage work on said work table, pattern means at one end of the base rotatable in synchronism with said work table, motion transfer means connected with said pattern means and rocker arm for moving said rocker arm and cutting means transversely of the base in accordance with variations in a pattern carried by said pattern means, said motion transfer means comprising a lever in said base pivotal about the axis of said spindle and having diametrically opposed long and short arms, said pattern means rotatably mounted on the long arm and an operating arm mounted on said shaft for movement therewith and operatively connected with the short arm of said lever whereby rotary motion of said shaft will result from movement of said pattern means and consequently of said lever about the axis of the spindle, and size control means connected with said motion transfer means for rotating said shaft relative to said motion transfer means to adjust said rocker arm and cutting means independently of said pattern means.

9. In a cutting machine of the character described, a base, a spindle rotatable in said base and carrying a work table for rotation therewith, clamp means on said base operable to engage and clamp work on said work table, a rocker arm mounted on a shaft journaled in said base and overlying said work table and carrying cutting means adapted to engage work on said work table, pattern means at one end of the base rotatable in synchronism with said work table, motion transfer means connected with said pattern means and rocker arm for moving said rocker arm and cutting means transversely of the base in accordance with variations in a pattern carried by said pattern means, said motion transfer means comprising a lever in said base pivotal about the axis of said spindle and having diametrically opposed long and short arms, said pattern means rotatably mounted on the long arm and an operating arm mounted on said shaft for movement therewith and operatively connected with the short arm of said lever whereby rotary motion of said shaft will result from movement of said pattern means and consequently of said lever about the axis of the spindle, and size control means connected with said motion transfer means for rotating said shaft relative to said motion transfer means to adjust said rocker arm and cutting means independently of said pattern means, said size control means comprising a gear carried by said shaft, a worm in mesh with said gear, and manual control means connected with said worm and extending externally of said base whereby said worm and gear may be rotated to cause consequent rotation of said shaft.

10. In a cutting machine of the character described, a base, a spindle rotatable in said base and carrying a work table for rotation therewith, clamp means on said base operable to engage and clamp work on said work table, a rocker arm mounted on a shaft journaled in said base and overlying said work table and carrying cutting means adapted to engage work on said work table, pattern means at one end of the base rotatable in synchronism with said work table, motion transfer means connected with said pattern means and rocker arm for moving said rocker arm and cutting means transversely of the base in accordance with variations in a pattern carried by said pattern means, said motion transfer means comprising a lever in said base pivotal about the axis of said spindle and having diametrically opposed long and short arms, said pattern means rotatably mounted on the long arm and an operating arm mounted on said shaft for movement therewith and operatively connected with the short arm of said lever whereby rotary motion of said shaft will result from movement of said pattern means and consequently of said lever about the axis of the spindle, and size control means connected with said motion transfer means for rotating said shaft relative to said motion transfer means to adjust said rocker arm and cutting means independently of said pattern means, said size control means comprising a gear carried by said shaft, a worm in mesh with said gear and mounted on a second shaft disposed in said operating arm, and manual control means connected with said second shaft carrying said worm, said worm being adjustable on said operating arm and independently thereof by operation of said manual control means whereby said worm and gear may be rotated to cause consequent rotation of said first-mentioned shaft.

11. In a device of the character described, a base, a spindle rotatable in said base and carrying a work table for rotation therewith, a rocker arm mounted on a shaft journaled in said base having a portion overlying said work table and carrying cutting means adapted to engage work on said work table, pattern means operatively connected with said rocker arm for moving said rocker arm and cutting means transversely of said work table, and clamp means on said base for clamping work on said work table comprising a head having a portion adapted to engage said work on the work table, a second shaft in said base carrying manual control means for operation of said clamp means, clutch means on said second shaft for locking said clamp means, said clutch means comprising a fixed toothed member mounted over said second shaft and secured to said base, a movable toothed member freely rotatable on said second shaft and operatively connected with said head, spring means connected with said movable toothed member for urging it in a direction away from said fixed toothed member, and a cam member attached to said second shaft for rotation therewith, said cam member being in pressure engagement with said movable toothed member for causing rotary movement thereof to move said head into clamping engagement with the work on said work table, said cam member being adapted, at a given position of movement to urge said movable toothed member into meshed engagement with said fixed toothed member for rendering said second shaft and control means immovable.

12. In a device of the character described, a base, a spindle rotatable in said base and carrying a work table for rotation therewith, a rocker arm mounted on a shaft journaled in said base having a portion overlying said work table and carrying cutting means adapted to engage work on said work table, pattern means operatively connected with said rocker arm for moving said rocker arm and cutting means transversely of said work table, and clamp means on said base for clamping work on said work table comprising a head having a portion adapted to engage said work on the work table, a second shaft rotatably mounted in said base carrying manual control means for operation of said clamp means, clutch means on said second shaft for locking said clamp means, said clutch means comprising a fixed toothed member mounted over said second shaft and secured to said base, a movable toothed member freely rotatable on said second shaft, yieldable spring tension linkage means connecting said movable toothed member with said head, spring means connected with said movable toothed member for urging it in a direction away from said fixed toothed member, and a cam member attached to said second shaft for rotation therewith, said cam member being in pressure engagement with said movable toothed member for causing rotary movement thereof to move said head into clamping engagement with the work on said work table, said cam member being adapted, at a given position of movement to urge said movable toothed member into meshed engagement with said fixed toothed member for rendering said second shaft and control means immovable.

13. In a device of the character described, a base, a spindle rotatable in said base and carrying a work table for rotation therewith, a rocker arm mounted on a shaft journaled in said base having a portion overlying said work table and carrying cutting means adapted to engage work on said work table, pattern means mounted on said base, motion transfer means operatively connecting said pattern means with said rocker arm for moving said rocker arm and cutting means transversely of said work table, and clamp means on said base for clamping work on said work table comprising a head having a portion adapted to engage said work on the work table, a second shaft rotatably mounted in said base and carrying manual control means for operation of said clamp means on said second shaft for locking said clamp means, said clutch means comprising a fixed toothed member mounted over said second shaft and secured to said base, a movable toothed member freely rotatable on said second shaft and operatively connected with said head, spring means connected with said movable toothed member for urging it in a direction away from said fixed toothed member, and a cam member attached to said second shaft for rotation therewith, said cam member being in pressure engagement with said movable toothed member for causing rotary movement thereof to move said head into clamping engagement with the work on said work table, said cam member being adapted, at a given position of movement to urge said movable toothed member into meshed engagement with said fixed toothed member for rendering said second shaft and control means immovable, and means for causing outward swinging movement of said rocker arm upon reverse rotation of said second shaft comprising a protruding member on said cam member and rotatable therewith, and a stop member carried by said motion transfer means, said protruding member being adapted to engage said stop member upon reverse rotation of said second shaft and to operate same to swing said rocker arm outwardly.

14. In a device of the character described, a base, a spindle rotatable in said base and carrying a work table for rotation therewith, a tiltable rocker arm mounted on a shaft journaled in said base having a portion overlying said work table and carrying cutting means adapted to engage work on said work table, pattern means operatively connected with said rocker arm for moving said rocker arm and cutting means transversely of said work table, and clamp means on said base for clamping work on said work table comprising a head having a portion adapted to engage said work on the work table, a second shaft rotatably mounted in said base carrying manual control means for operation of said clamp means, linkage connecting said second shaft with said head, clutch means on said second shaft for locking said clamp means, and means for tilting said rocker arm and cutting means carried thereby comprising resilient means mounted in said base and movable in a direction parallel with said spindle and having a pivot member thereon, depressing means on said clamp means for engaging said resilient means and controlling the location of said pivot member with respect to the surface of the work on the work table, and a slotted member carried by said rocker arm, said pivot member being disposed in said slotted member whereby the rocker arm may swing transversely during a cutting operation and simultaneously pivot about said pivot member to cause said cutting means to be automatically tilted a predetermined amount, which amount is directly related to the combination of the transverse distance from the axis of said spindle to the engaging edge of said cutting means with the work and the vertical distance between the center surface of the work and a horizontal plane passing through said point of engagement of the cutting edge with the work.

15. In a device of the character described, a base, a spindle rotatable in said base and carrying a work table for rotation therewith, a rocker arm pivotally mounted on a shaft journaled in said base having a portion overlying said work table and carrying cutting means adapted to engage work on said work table, pattern means operatively connected with said rocker arm for moving said rocker arm and cutting means transversely of said work table, and clamp means on said base for clamping work on said work table comprising a head having a portion adapted to engage said work on the work table, a second shaft rotatably mounted in said base carrying manual control means for operation of said clamp means, linkage connecting said second shaft with said head, clutch means on said second shaft for locking said clamp means, and means for pivoting said rocker arm relative to said shaft to position the cutting means thereon in a plane substantially normal to the surface of the work at the point of engagement therewith comprising a plunger member carried in said base and movable in a direction substantially parallel with the axis of said spindle, a roller on said plunger member, means on said head for positioning said plunger member to locate the roller substantially in the plane of the center of said work, and a slotted guide member on said rocker arm receiving said roller, said rocker arm being adapted to move transversely of said work and to simultaneously move about the axis of said roller during a cutting operation in accordance with the contour variations of the pattern means and the surface curvatures of the work.

16. In a cutting machine of the character described, the combination of a base having a rotatable work supporting table thereon, a supporting bar pivotally mounted on said base for rotary movement about an axis parallel to the axis of rotation of said work supporting table, a plate pivotally connected adjacent one end thereof to said supporting bar for movement about an axis substantially normal to the axis of said pivot for said supporting bar, a cutter arm pivotally mounted adjacent the opposite end of said plate for tilting movement about an axis substantially parallel to the axis of the pivot for said plate, a cutter rotatably attached to said cutter arm adjacent the end thereof opposite its pivotal connection with the plate with the axis of rotation of said cutter disposed substantially normal to the pivotal connection of the cutter arm to said plate, said cutter being positioned in overlying relation with said table, adjustable means on said base for clamping work to be cut on said table, means for moving said cutter into and out of engagement with a side surface of said work about the axis of the pivotal connection of the plate to said supporting bar, means associated with the work supporting table so as to be rotated therewith when said table is rotated, means responsive to the last-named means for causing said cutter to move in a direction toward and away from the axis of said work supporting table about the pivot of said supporting bar to said base, engagement means movably supported on said base along an axis substantially parallel with the axis of rotation of the work supporting table and being movable along said axis in response to the movement of said adjustable means in clamping the work on said table, said engagement means having a pivot post thereon adapted to assume a fixed position with respect to a plane tangent with the center of the upper surface of the work when said work is in clamped position on said work supporting table, lever means carried by said cutter arm adapted to engage said pivot post and in response to the movement of said cutter arm about the axis of the pivot of said supporting bar being adapted to have its effective length altered by an amount sufficient to cause the cutter to tilt and assume an angle substantially normal to the tangent of the surface of the work at any point of engagement of the cutter therewith when said work supporting table is rotated and the said cutter is caused to move toward and away from the axis of said work supporting table.

References Cited in the file of this patent

UNITED STATES PATENTS 1,997,561     Lockhart _________________ Apr. 9, 1935